United States Patent [19]

Munro

[11] 4,258,540
[45] Mar. 31, 1981

[54] AGRICULTURAL BALER

[75] Inventor: James A. Munro, Long Crendon, near Aylesbury, England

[73] Assignee: Sperry Corporation, New Holland, Pa.

[21] Appl. No.: 41,212

[22] Filed: May 21, 1979

[30] Foreign Application Priority Data

May 31, 1978 [GB] United Kingdom ............... 25795/78

[51] Int. Cl.³ .......................................... A01D 90/08
[52] U.S. Cl. ........................................ 56/341; 100/189
[58] Field of Search ........................... 56/341–343; 100/189, 142, 139

[56] References Cited

U.S. PATENT DOCUMENTS

| | | | |
|---|---|---|---|
| 2,362,861 | 11/1944 | Russell | 56/341 |
| 2,725,009 | 11/1955 | Bornzin | 100/189 |
| 2,917,993 | 12/1959 | Nikkel | 100/189 |
| 2,948,101 | 8/1960 | Long | 56/341 |
| 2,977,873 | 4/1961 | Crane et al. | 100/142 |
| 3,020,830 | 2/1962 | Harrington | 56/341 |
| 3,483,688 | 12/1969 | Hollyday | 56/341 |
| 3,724,363 | 4/1973 | Noh | 56/341 |
| 3,984,969 | 10/1976 | Yatcilla | 56/341 |
| 4,009,558 | 3/1977 | Schulze et al. | 56/341 |
| 4,015,410 | 4/1977 | Smith | 56/341 |

*Primary Examiner*—Paul J. Hirsch
*Attorney, Agent, or Firm*—James R. Bell; Frank A. Seemar; Larry W. Miller

[57] ABSTRACT

An agricultural baler of monocoque construction having a fore-and-aft extending bale case, and a first rigid member connected at one end to the bale case intermediate its ends and extending away therefrom in a transverse direction, the bale case and the rigid member forming a self-supporting structure adapted to support further components thereof. A second rigid member may be provided attached at one end to the bale case.

6 Claims, 14 Drawing Figures

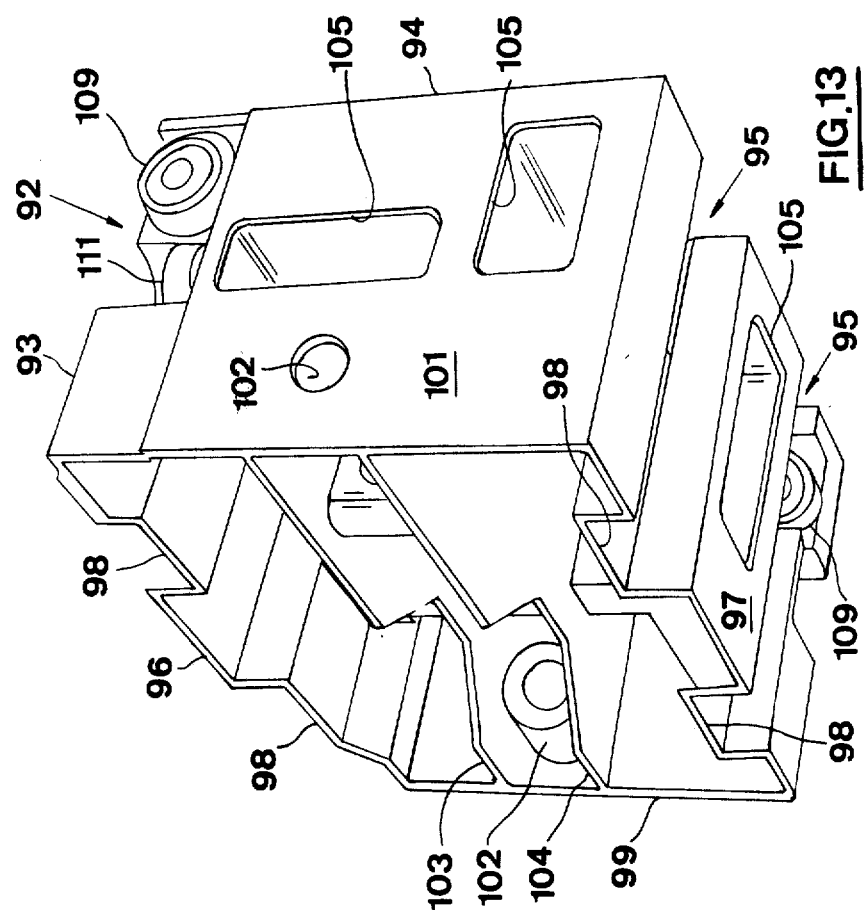

AGRICULTURAL BALER

BACKGROUND OF THE INVENTION

1. Field of the Invention

This invention relates to mobile argricultural balers.

In the mechanization of the farm there has been a great deal of emphasis on the mechanical harvesting and gathering of crops. One of the machines which has been developed is the mobile baler which often is of the tractor pull type but also may be of the self-propelled type. Mobile balers move across fields to pick up crop laying in windrows or swaths and compress that crop into rectangular bales. The bale is of a convenient size and form for handling either manually or by machinery.

2. Description of the Prior Art

A conventional hay baler has a fore-and-aft extending bale case and a plunger reciprocable therein, both the bale case and the plunger being generally rectangular in transverse cross-section. The bale case has an inboard side wall provided with an inlet feed opening for crop material. The baler also has a crop pick-up and feed mechanism operable to deliver crop material through the inlet feed opening and into the bale case.

The reciprocating plunger operates to compress the crop material within the bale case to form bales. When the plunger is retracted, the bale case inlet feed opening is open and the operation of the feed mechanism is timed relative to the plunger to deliver a charge of crop material through the inlet feed opening and into the bale case at that moment. When the plunger moves in its working direction to compress the delivered charge of crop material, one side face of the plunger closes the inlet feed opening. However, the timing of the feed mechanism is such as to ensure withdrawal of the feed mechanism from the feed opening before the latter is closed by the plunger. In order to separate the crop material within the feed area outside the bale case from the material just delivered into the bale case by the feed mechanism, the plunger is provided with a knife which cooperates with a stationary knife or shear bar positioned along the bale case inlet opening to sever the crop material during the working stroke of the plunger.

Each completed bale is banded with twine or wire. The tying medium is threaded around each bale by needles which deposit with precision the tying medium in knotter or twister mechanisms which operate to knot or twist the ends of the twine or wire, respectively. The tied bales are then ejected from the baler.

The terms "forward", "rearward", "left", "right", etc. when used throughout this specification in connection with the baler and/or components thereof are determined by facing in the direction of operative travel of the baler in the field.

In most baler designs known today, the baler mechanism is mounted on top of a tranverse wheel axle and supported on a pair of ground wheels at opposite ends of that axle. The axle extends transversely below the feed mechanism and rearwardly of the crop pick-up means. A baler of the foregoing type comprises a relatively large number of components, whereby the weight of the machine is comparatively high, the cost is accordingly high and the design is complicated. Nevertheless, the structural strength has not always been sufficient.

Because of the weight of the baler and because of the flotation characteristics required, wheel hubs and tires of a certain size have commonly been used. Also, it is desirable, for a number of reasons, to have the baler mechanism at a predetermined, relatively small, height above the ground. A low profile machine is always desirable, not only to minimize the size and weight of the components but also to allow the operator to see from his seat the discharge end of the bale case so that he can check whether the bales are being properly completed. Also, as the crop material is picked up from the ground and supplied to the feed mechanism which is at the level of the infeed opening in the bale case, the underside of the feed housing and the bale case should be at the same level as the discharge end of the pick-up means. Conventional pick-up means operate satisfactorily provided their lift does not exceed a certain limit. Hence the bale case and feed housing also should not be positioned higher than a predetermined, relatively small, height above the ground.

In view of the wheel hub and tire sizes dictated inter alia by the machine weight, and in view of the optimum height of the baler mechanism above the ground, it has been common practice to provide one wheel to the left of the bale case. This wheel extends as high as or, as is more often the case, above the level of the underside of the bale case. The right-hand wheel conventionally is positioned rearwardly of the right-hand end of the pick-up means and to the right of the extreme right-hand end of the feed mechanism.

During recent years, however, the size of the baler, especially the width of the pick-up means, have continuously been increased to provide higher capacity balers. With the advent of giant combine harvesters and hay-tools of ever-increasing size, on the one hand, and with the demands for ease of operation, on the other hand, it is becoming necessary to have still wider crop pick-up means.

However, the maximum road transport width for pull-type agricultural machines tends to be restricted to 2.5 meters in several countries. Also, the practical maximum width for transporting balers on trucks is 2.5 meters. This width is already attained or even exceeded by most of the present day high-capacity balers. Thus the limiting factors for the width of the pick-up means are on the one hand, the legal and practical transport requirements dictating a maximum overall width and, on the other hand, the size and position of the wheels and the width of the bale case, the latter being determined by the width of the bales to be made.

The wheels of conventional balers are mounted on spindles fixed to the main transverse axle. This is disadvantageous especially when the baler is pulled at high speed over rough terrain because the resulting vibration of the machine can loosen components and the machine can be subjected to high peak loads. Occasionally, the proper operation of the baler also may be hindered by this vibration.

Conventional balers usually comprise a welded main body formed by a generally fore-and-aft extending bale case and the transverse feeder housing secured to the bale case intermediate its ends. The tranverse wheel axle already mentioned above is also a relatively large welded assembly. Welding normally imparts sufficient strength to a structure but it is a relatively expensive and slow operation and can cause problems of deformation of the workpiece, especially when large assemblies involving much welding are involved. Furthermore welding can create substantial air pollution in a welding shop. The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing an agricultural baler having a bale case and a crop feed housing connected thereto. A crop feed opening is formed in the bale case adjacent the connection. First and second support members are connected to the bale case and the crop feed housing. A first wheel support is connected to the second support member adjacent one end of the crop feed housing and a second wheel support member is connected to the bale case adjacent another end of the crop feed housing. Wheels are connected to the wheel support members.

According to the present invention an agricultural baler comprises a fore-and-aft extending bale case, and a first rigid member connected at one end to the bale case intermediate its ends and extending away therefrom in a tranverse direction, the bale case and the rigid member forming a self-supporting structure adapted to support further components thereon.

A second rigid member may be provided, being connected at one end to the bale case intermediate its end and extending away therefrom in a transverse direction and forming part of the self-supporting structure. Preferably, the first and second rigid members are hollow, the first member having a top surface forming a feed platform for crop material in use fed to the bale case by a feed mechanism, and the second member having a base surface attached at said one end to an upper surface of the bale case and housing drive means forming part of the feed mechanism. The second member may have a side surface provided with apertures through which access can be gained to the feed mechanism drive means and may be triangular in cross-section with said side surface extending upwardly and rearwardly of the baler. Furthermore, the second member may extend above and forwardly beyond the first member and comprise a further side surface which extends generally vertically and on which the feed mechanism is mounted, the base of the second member defining with the top surface of the first member part of a feed channel for crop material. Each of the first and second members may be of sheet metal construction and assembled by lock bolt fasteners which eliminate or reduce welding.

Crop pick-up means may be pivotally mounted on the self-supporting structure either entirely on the first member or between the first member and the bale case.

It will be appreciated that the first and second members, when both are provided, are integrated into the baler construction giving rise to a chassis-less machine having a single rigid shell which bears most of the operating stresses. Thus the baler is a monocoque construction.

A ground-engaging wheel structure may be mounted beneath the bale case, with a similar structure mounted on the first member towards the end remote from the bale case. The or each wheel structure may comprise a plurality of ground-engaging wheels, the diameter of each of which may be 500 mm. In one embodiment a single wheel may be provided beneath the first member and twin wheels beneath the bale case. In an alternative embodiment, three wheels are employed under the bale case and two under the first member. Preferably the or each wheel structure comprises a rigid mounting member, a movable arm pivotally mounted at one end on the mounting member and rotatably supporting one or more ground-engaging wheels at the other end, and resilient means disposed between the rigid mounting member and the movable arm at a location spaced from the pivot point of the arm. The resilient means may comprise one or more rubber blocks arranged for compression by the weight of the baler, thus absorbing shock loads.

The provision of the wheel structures beneath the baler, as opposed to either side on an axle as in known balers, keeps the width of the machine within the 2.5 meter limit whilst allowing maximum width for the baler components, notably the pick-up means which can have a length of 1.8 to 2.0 meters. Also, the small diameter wheels keep the overall height of the baler to a minimum with adequate suspension being provided within the wheel structures.

The bale case may be provided with a bale plunger of open box structure and mounted therein for reciprocation along the bale case. Preferably the plunger is die cast in aluminium to reduce the weight and may have rollers for rolling contact with guide surfaces provided in the bale case.

BRIEF DESCRIPTION OF THE DRAWINGS

A pull type agricultural baler constructed in accordance with the present invention will now be described in greater detail, by way of example, with reference to the accompanying drawings, in which:

FIG. 13 is a perspective view, similar to FIG. 12, but showing the plunger from another side and with certain components omitted.

DETAILED DESCRIPTION OF THE PREFERRED EMBODIMENT

Figure 1:
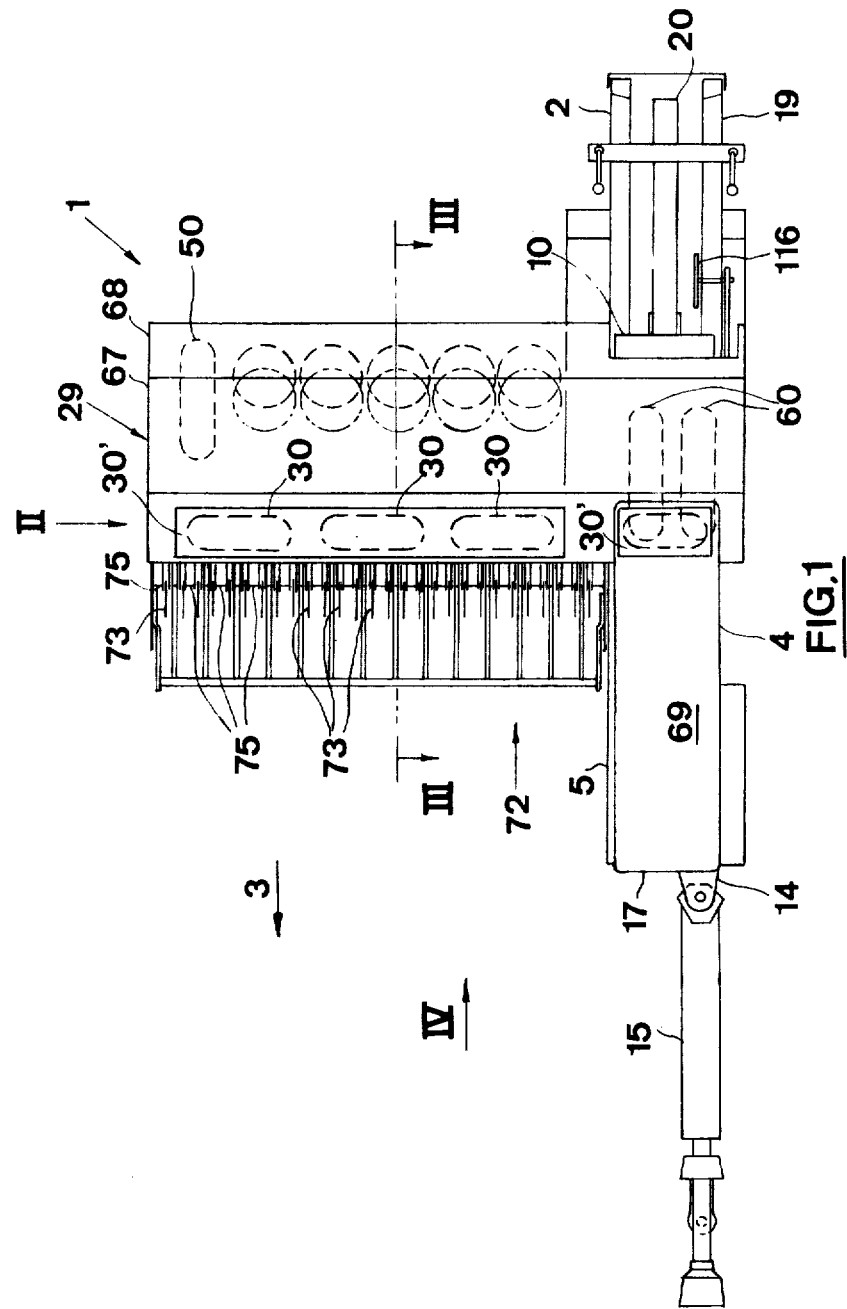
FIG. 1 is a schematic top view of the baler in a transport position.
Figure 2:
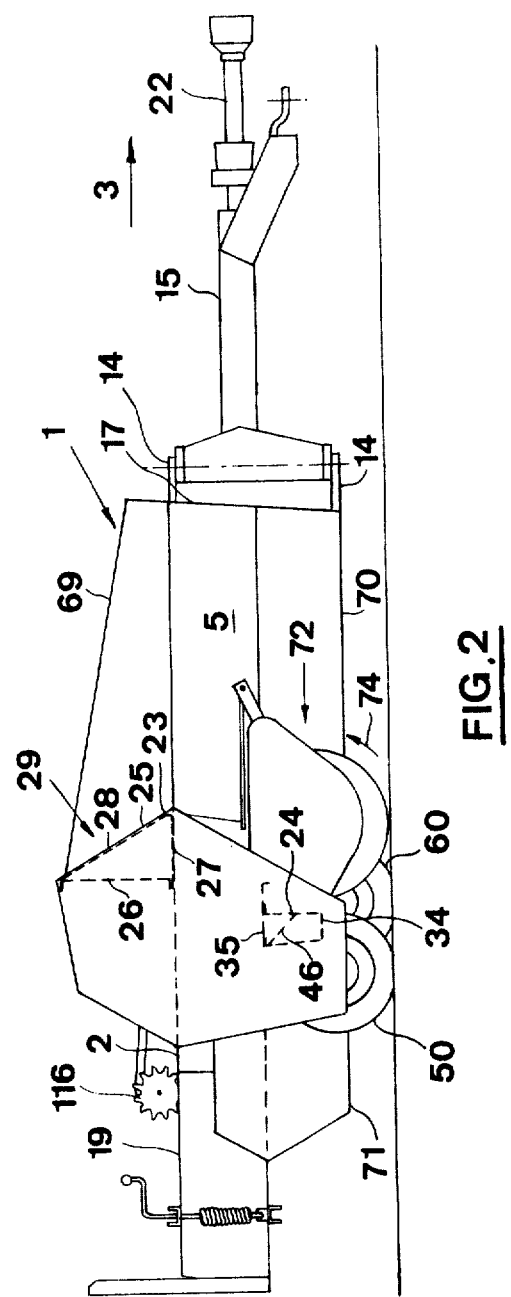
FIG. 2 is a side view taken in the direction of arrow II of FIG. 1.
Figure 5:
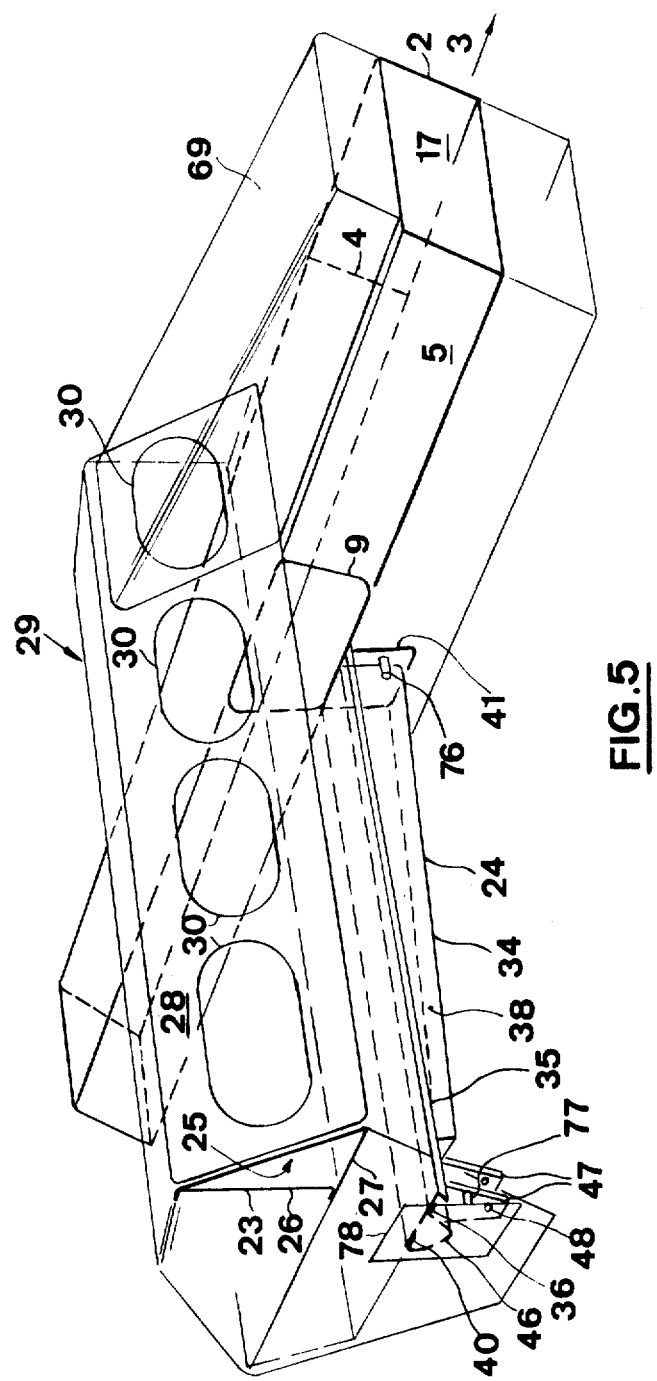
FIG. 5 is a perspective view illustrating the main body of the baler, according to the invention.
Figure 6:
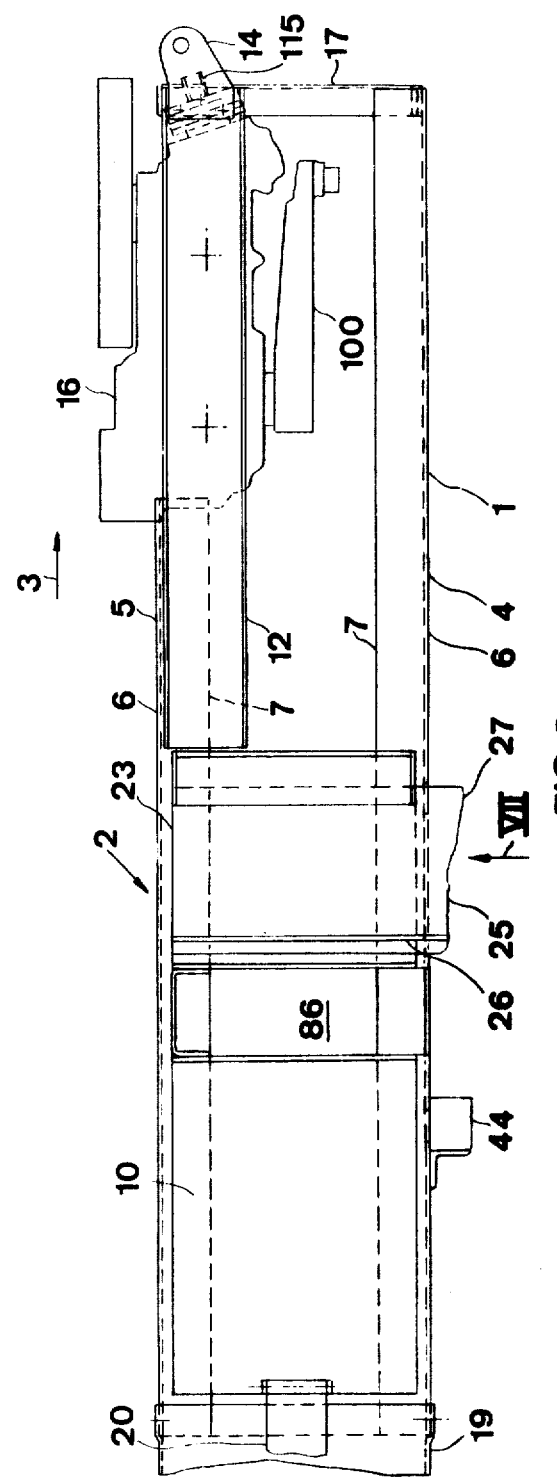
FIG. 6 is a top view on a larger scale of the bale case of the baler.
Figure 7:
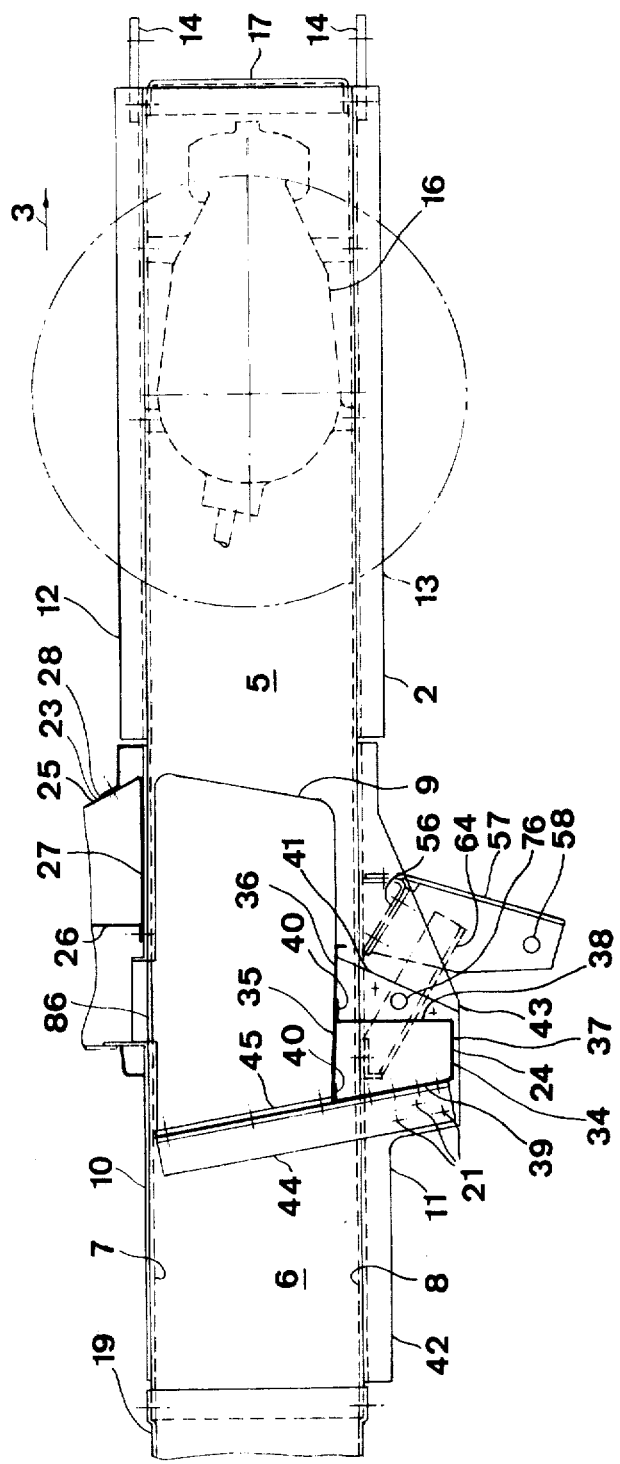
FIG. 7 is a side view taken in the direction of arrow VII of FIG. 6.

Referring to the drawings, the baler is indicated generally at 1 and comprises a bale case 2 which extends in a fore-and-aft direction relative to the direction of operative travel of the baler which is indicated at 3. The bale case 2 is rectangular in cross section and has left- and right-hand side walls 4 and 5, respectively. The side walls 4 and 5 are formed from sheet metal plates 6 having inwardly extending upper and lower flanges 7 and 8 respectively, which together generally define the upper and lower walls of the bale case 2. The left-hand side wall 4 stops short of the front end of the bale case 2, as seen in FIG. 6, and the right-hand side wall 5 is formed with a feed opening 9 intermediate its ends (FIGS. 5 and 7). The side walls 4 and 5 are rigidly coupled together and held in position by upper and lower plates 10 and 11 which bridge the respective upper and lower flanges 7 and 8 intermediate the ends of the side walls. Upper and lower mounting beams 12 and 13 are bolted to the respective flanges 7 and 8 on the left-hand side wall 4 and project in forward direction slightly beyond the forward end of the right-hand side wall 5 (FIGS. 6 and 7), at which end brackets 14 are provided for the pivotal attachment of a drawbar 15 (FIGS. 1 and 2).

Figure 14:
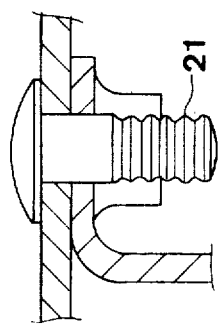
FIG. 14 shows schematically a fastener used in the construction of the baler.

The mounting beams 12 and 13 support a gearbox 16 immediately behind the brackets 14, the appropriate components of the baler being driven from the power-take-off shaft of the towing tractor (not shown) via the gearbox. The foward end of the bale case 2 is defined by a front wall 17 with inwardly extending flanges which are attached to the side walls 4 and 5 and the flanges 7 and 8 thereof. The front wall 17 has an aperture for the through passage of an input shaft 22 for the gearbox 16. The bale case 2 also comprises a detachable bale case extension 19, which may be detached for transport purposes. Pivotable tension rails 20 are pivotally mounted on the rear edges of the upper and lower plates 10 and 11. The bale case described above is a rigid structure formed by firmly securing all components together by special lock bolt fasteners 21 shown in FIG. 14 which are permanent fasteners and are available under the trade names "Avdel" and "Huck". Thus the amount of welding involved in the construction of the bale case 2 is substantially reduced, thereby minimising the disadvantages which are inherent in welding.

The drawbar 15 extends forwardly of the brackets 14 at the forward end of the bale case 2, close to the left-hand corner thereof. The drawbar 15 is relatively short compared with known drawbars, and supports the shaft 22 which is connectible to the tractor power-take-off shaft and, as already mentioned, forms the input to the gearbox 16.

In a conventional baler, the main body is mounted on a transverse main shaft having wheels at its extreme ends, so that the bale case and feeder housing are not self-supporting. According to the present invention, the main body of the baler is a self-supporting structure comprising a rigid fore-and-aft extending component formed by the bale case 2, and a transversely-extending rigid member or beam. In the present embodiment a pair of transversely extending rigid beams 23 and 24 is rigidly attached to the top and bottom, respectively of the bale case 2 intermediate its ends. This gives rise to a very rigid, self-supporting main body for the baler as shown schematically in FIG. 5, which is a monocoque structure.

Figure 4:
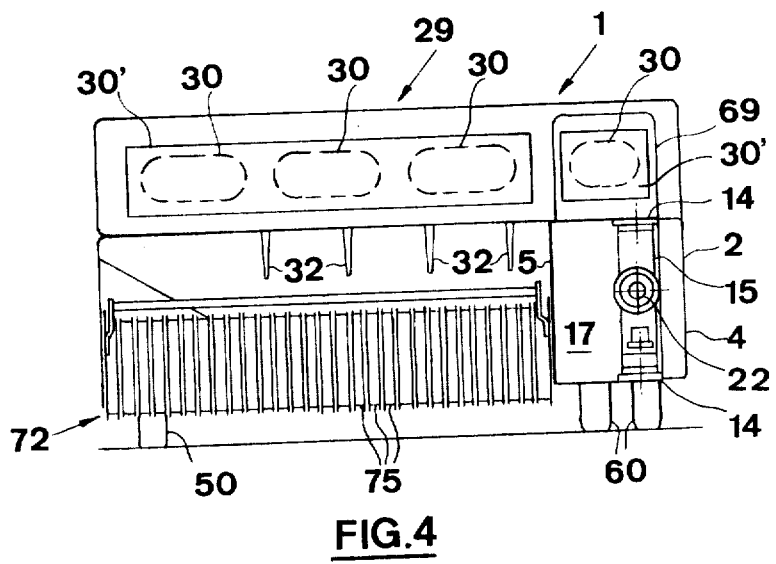
FIG. 4 is a schematic front view taken in the direction of arrow IV of FIG. 1.
Figure 11:
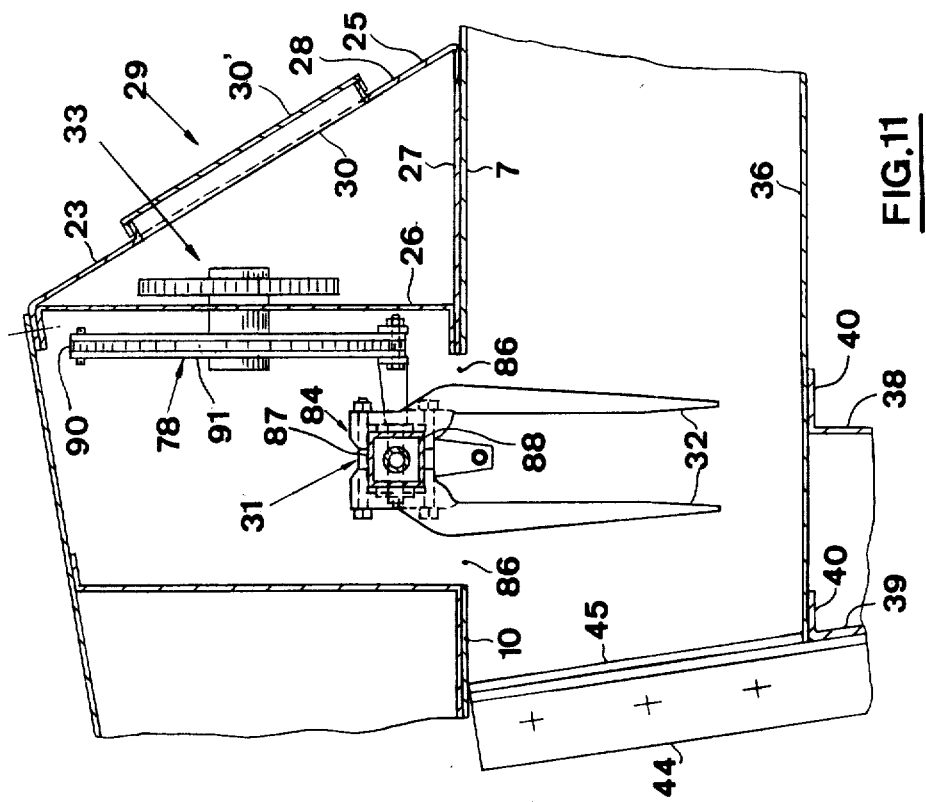
FIG. 11 is a sectional view along the line XI—XI of FIG. 10.

The upper rigid transverse beam 23 is generally triangular in cross section and is formed by first and second sheet metal members 25 and 26, respectively firmly secured together at their opposite edges with the same type of lock-bolt fastener 21 as mentioned above. The first member 25 is formed from a single sheet of metal bent so as to define a lower, generally horizontally-extending wall portion 27 and an upwardly and rearwardly inclined wall portion 28. The wall portion 28 forms the front wall of a housing 29 for a crop feed mechanism of the baler and is provided with a plurality of elongate access openings 30 which can be closed by detachable covers 30' (FIGS. 1, 4 and 11). The wall portion 27 is fastened at its left-hand end by lock-bolt fasteners to the top wall of the bale case 2 at a location slightly in front of the upper plate member 10, and above the forward portion of the feed opening 9. The wall portion 27 thus bridges the gap between the upper flanges 7 of the bale case side walls 4 and 5 and defines in combination with the upper plate member 10 an opening through which the feed mechanism can move.

Figure 3:
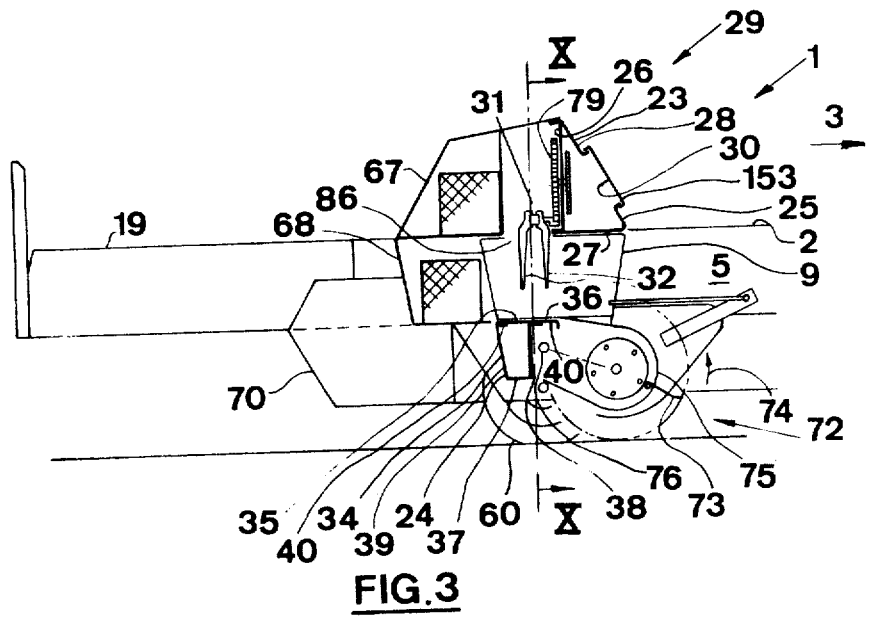
FIG. 3 is a sectional view along the line III—III of FIG. 1.

The second sheet metal member 26 provides a generally vertically-extending wall having upper and lower flanges for attachment to the corresponding edges of the first sheet metal member 25. Both members 25 and 26 are fastened together by lock-bolt fasteners and thereby form a rigid beam of substantial strength. The second member 26 supports, via bearing means, the feed mechanism generally indicated at 31 (FIG. 3) and to be described in more detail. This feed mechanism may be of the type described in U.S. Pat. No. 3,724,363. It should be noted here that feed fingers 32 of the feed mechanism are positioned rearwardly of the rear wall 26, while drive means 33, comprising inter alia a chain drive, are provided on the opposite side of the wall 26 and inside the triangular beam 23. Access to the drive means 33 is possible through the aforementioned access openings 30.

Figure 8:
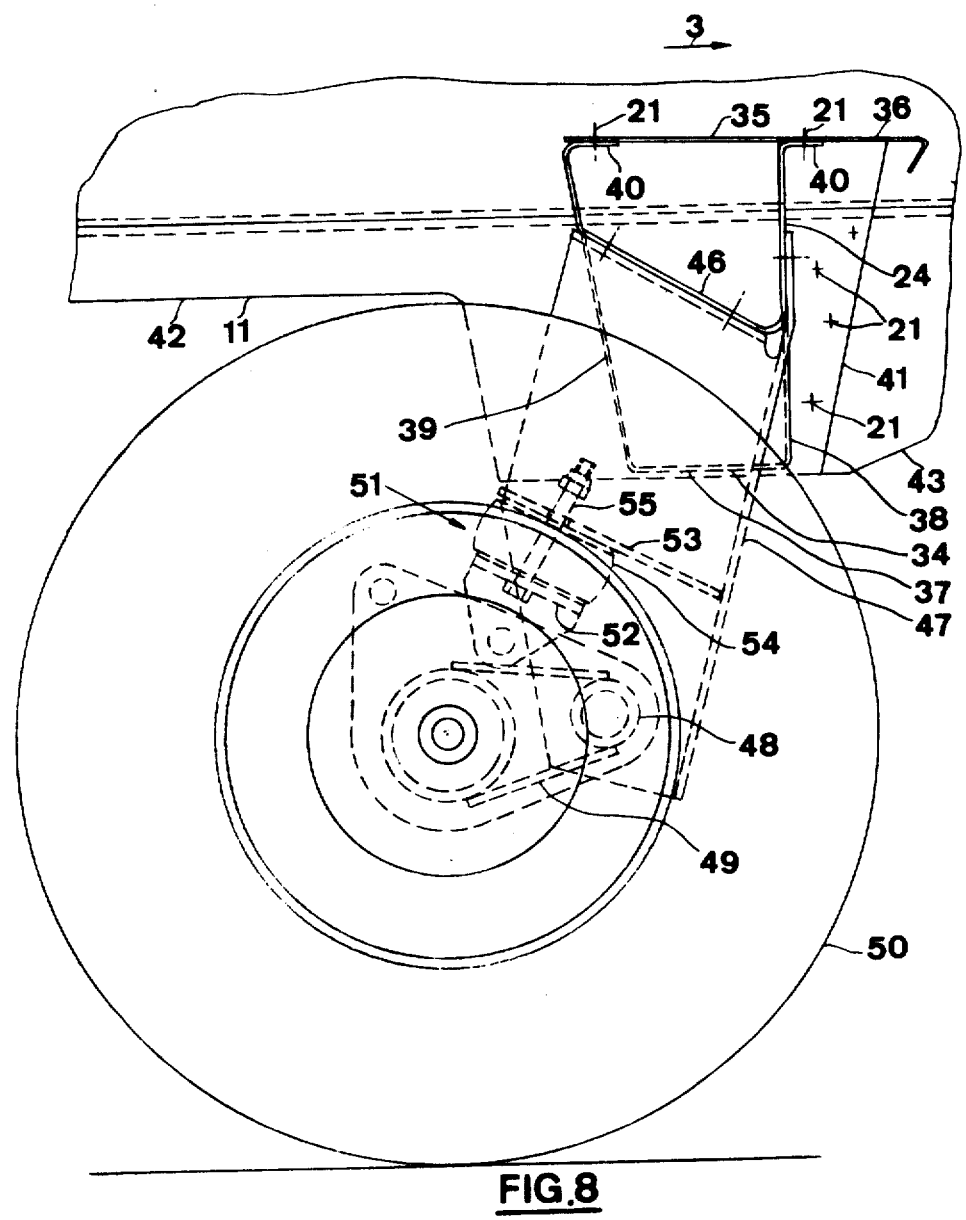
FIG. 8 is a side view of a right-hand wheel structure of the baler.

The lower transverse beam 24 of the main body is generally rectangular in cross section, tapering from left to right, and comprising a lower bent sheet metal member 34 of special shape and an upper, generally flat and horizontally-extending sheet metal member 35 attached to the member 34 by lock-bolt fasteners. The member 35 extends in a forward direction beyond the forward edge of the lower member 34 and at the level of the lower edge of the feed opening 9. The member 35 is positioned below the feeder mechanism 31 and forms a feed platform 36. The lower sheet metal member 34 is bent so as to have (as best seen in FIGS. 7 and 8) a lower horizontal wall portion 37, front and rear wall portions 38 and 39, respectively, and upper flanges 40 to which the member 35 is attached by lock-bolt fasteners. The rigid beam 24 so formed also comprises a mounting bracket 41 at its left-hand end adapted for fixation to the lower plate member 11. To this end, the lower plate member 11 is of a generally flat, welded structure comprising a right-hand side edge 42, with a deeper portion 43 at the mounting point of the same height as the lower mounting beam 24 as seen in FIG. 7. An angle iron 44 is secured by lock-bolt fasteners to the beam 24, the side edge 42 of the plate member 11, and the side wall 5 of the bale case 2 to stiffen the entire structure. The angle iron 44 extends along the rear edge of the feed opening 9 and is adapted to support a shearbar 45.

At its right-hand end, the mounting beam 24 comprises an inclined mounting surface 46 on which is mounted a wheel support 47 supporting a transverse pivot 48 adjacent its lower end (FIG. 8). The wheel support 47 is inclined rearwardly and downwardly and supports a wheel pivot arm 49 carried by the pivot 48, which arm extends rearwardly of the support 47. A tired wheel 50 of a relatively small diameter is rotatably mounted on the rear end of the pivot arm 49, the latter being held in a generally horizontal position by a shock absorber 51 comprising a first stop 52 pivotally mounted on the pivot arm 49, and a further stop 53 on the wheel support 47, a resilient shock-absorbing rubber block 54 therebetween, and a mounting bolt 55 extending through the stops 52 and 53 and through the rubber block 54. The mounting bolt 55 secures the components, on the one hand, and yet can slide relative to the upper stop 53 when the resilient block 54 is compressed, on the other hand. The wheel 50 is positioned on the side of the wheel support 47 facing the bale case 2 and underneath the feed housing 29; this is the only wheel provided underneath the feed housing. However, it will be understood that twin wheels, for example, may be mounted on the wheel support 47 to increase baler flotation and support, especially since the wheels are of a relatively small diameter such as 500 mm for example. It should be noted here that the right-hand wheel 50 is provided underneath the feed housing 29 at a location rearwardly of the crop pick-up means rather than, as is conventional, to the right of the right-hand side of the feed mechanism.

Figure 9:
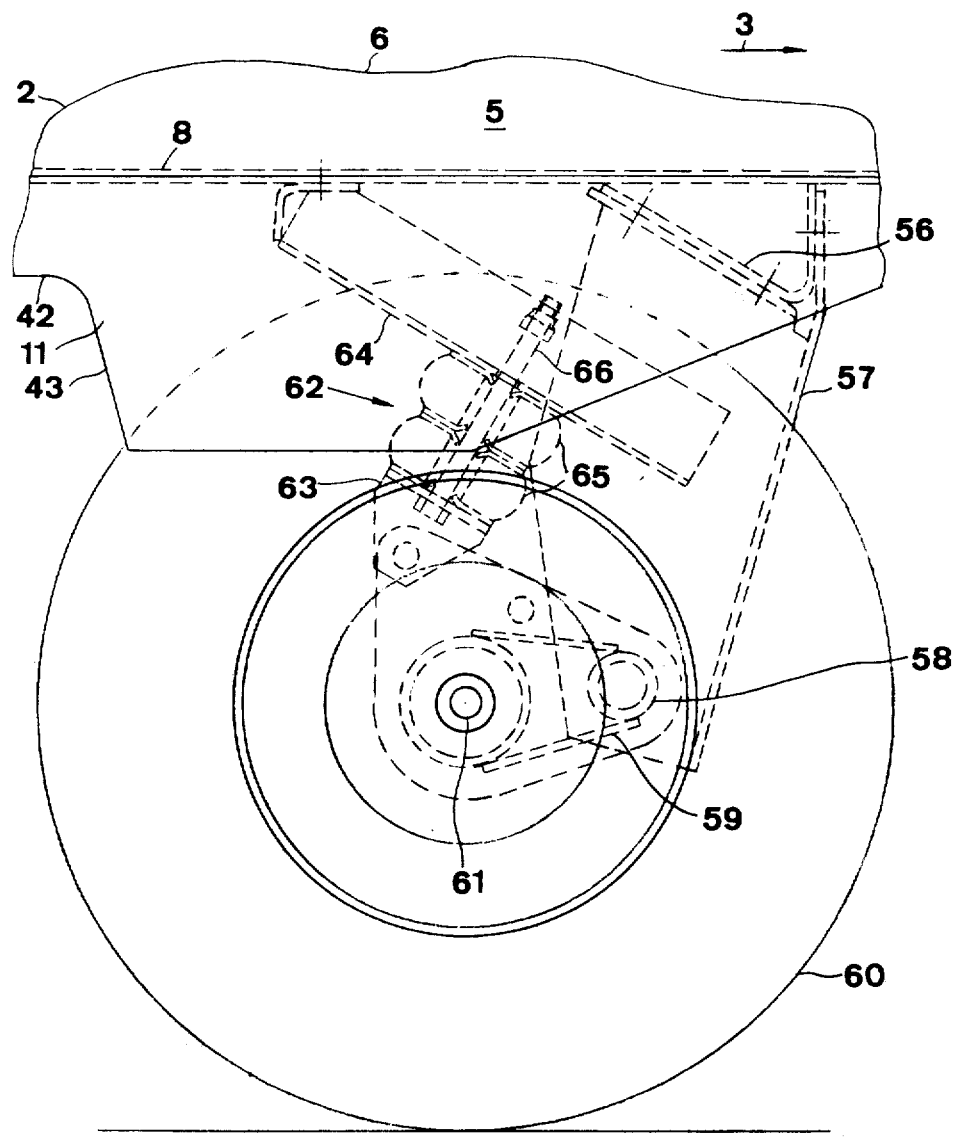
FIG. 9 is a side view of a left-hand wheel structure of the baler.

The lower plate member 11 further comprises an inclined mounting surface 56 on which is mounted a further wheel support 57 (FIG. 9) which also extends downwardly in a rearward direction and comprises at its lower end a pivot 58 for pivotally mounting thereon a pivot arm 59. A pair of tired wheels 60 is rotatably mounted on a wheel spindle or axle 61 at the rear end of the pivot arm 59 and is positioned at opposite sides of the wheel support 57 and underneath the bale case 2, rather than alongside the left-hand side thereof which is the normal position. To this end, and to avoid raising the position of the bale case 2 more than is desirable, the wheels 60 are of the same relatively small diameter as the right-hand wheel 50. Preferably, the underside of the bale case 2 is at a height of about 550–600 mm above the ground surface. If twin wheels 60 do not provide sufficient flotation and support at the left-hand side of the baler, it will be obvious that three wheels could be employed at this location.

As with the right-hand wheel 50, shock-absorbing means 62 are associated with the left-hand wheels 60 and comprise a first stop 63 pivotally mounted on the wheel pivot arm 59 adjacent the wheel spindle 61, a further stop 64 fixedly mounted on the wheel support 57, and a pair of rubber blocks 65 positioned therebetween. A mounting bolt 66 extends through the stops 63 and 64 and the rubber blocks, and restricts the downward movement of the wheel pivot arm 59 while retaining all components in the required positions.

Having described so far the main body of the baler, reference will now be made to other components. Upper and lower twine boxes 67 and 68, respectively, (FIGS. 1 and 3) are provided rearwardly of the feed mechanism 31 and are of sheet metal construction attached to the upper and lower transverse mounting beams 23 and 24 by lock-bolt fasteners. The twine boxes 67 and 68 may extend the full width of the feed mechanism and thus have a width sufficient for each to hold five balls of twine. Shieldings such as those indicated at 69, 70 and 71 (FIG. 2) may be provided for safety reasons and or to improve the machine styling.

Forwardly of the feed mechanism 31, a crop pick-up mechanism is provided which is generally indicated at 72 and may be of conventional type comprising pick-up fingers 73 movable as indicated by the arrow 74, to elevate previously cut and windrowed crop material and to deliver it rearwardly to the feed platform 36. To this end, the pick-up mechanism 72 has a plurality of pick-up guards 75 alternating with the pick-up fingers 73 and having their upper and rear discharge ends positioned just above the forward edge of the feed platform 36 so as to form a smooth transition therewith. The pick-up mechanism 72 is pivotally mounted on pivot pins 76 and 77 on the right-hand side edge 42 of the lower plate member 11 and on an end plate 78 of the lower transverse beam 24 which is firmly secured to that beam by lock-bolt fasteners. The pick-up mechanism 72 extends the full width of the feed mechanism 31 and in front thereof, as well as in front of the right-hand side wheel 50. The pick-up mechanism 72 may have a width in the range of 1.8 to 2 meters, thus leaving about 0.50 to 0.70 meters for the bale case 2 having regard to the fact that the overall baler width should not exceed 2.50 meters.

Figure 10:
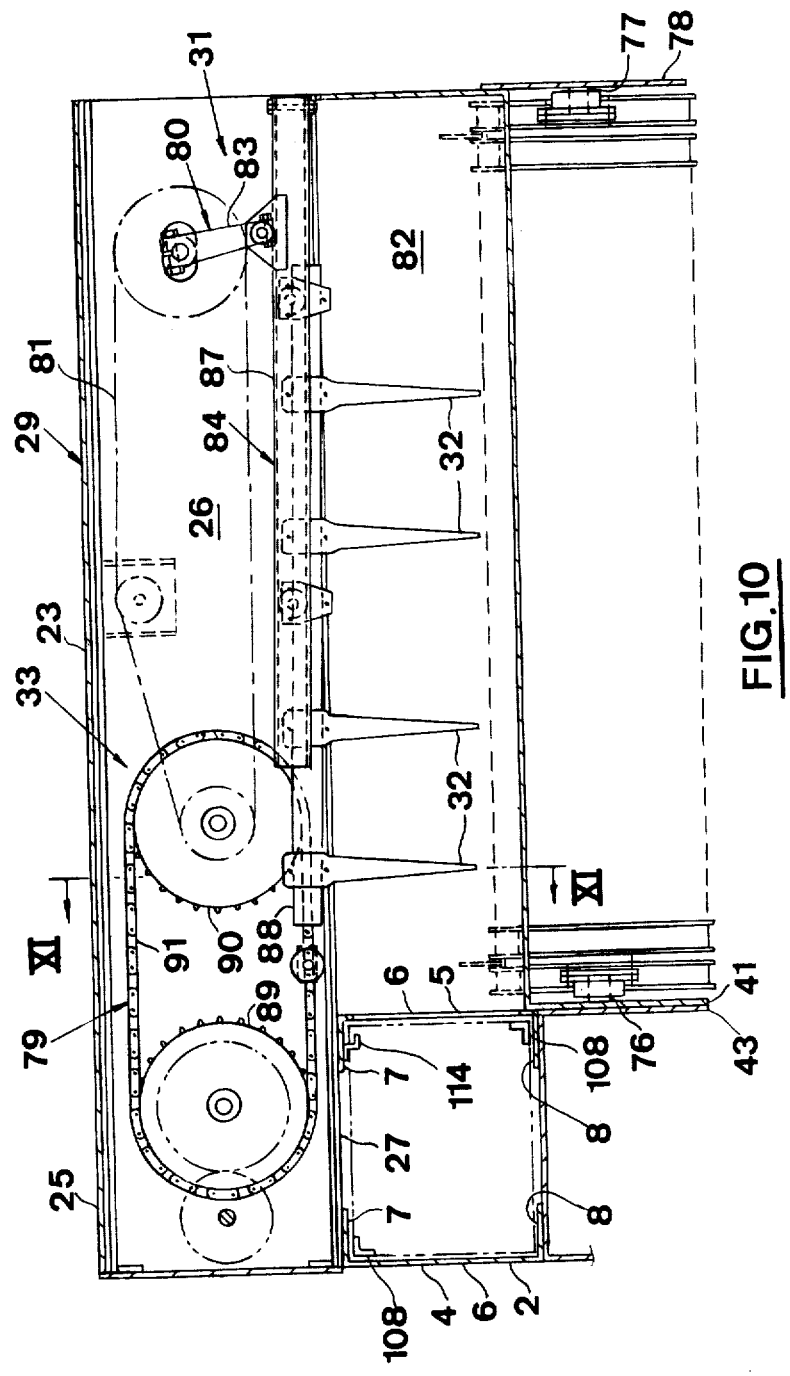
FIG. 10 is a partial sectional view along the line X—X of FIG. 3, but on a larger scale and showing more detail.

With reference to FIGS. 10 and 11, the feed mechanism 31 will now be described in further detail. The feed mechanism 31 comprises a first rotary drive means 70 and a second rotary means 80 with a chain 81 connecting these two drives. The first rotary drive means 70 is an oval or elliptical path drive disposed generally over the bale case 2 and the adjacent end of a feed chamber 82 and comprises two sprockets 89 and 90 and a chain 91 extending therearound. The second rotary drive means 80 comprises a rotatable crank 83 at the outboard end of the feed chamber 82 and is driven through the inboard and first rotary drive means 70 by the chain 81. A reciprocable feed finger support 84 is connected between the two drives 79 and 80 and carries the feed fingers 32 in a linear motion longitudinally along the feed chamber 82 with the lead feed finger travelling through the feed chamber 82 into the bale case 2. To this end a slot 86 is provided in the top wall of the bale case 2 defined by the upper plate 10 and wall portion 27 as already generally mentioned. The support 84 comprises a feed finger support member 87 and a guide support member 88 which cooperate telescopingly in a manner to provide linear motion of the feed fingers 32.

Figure 12:
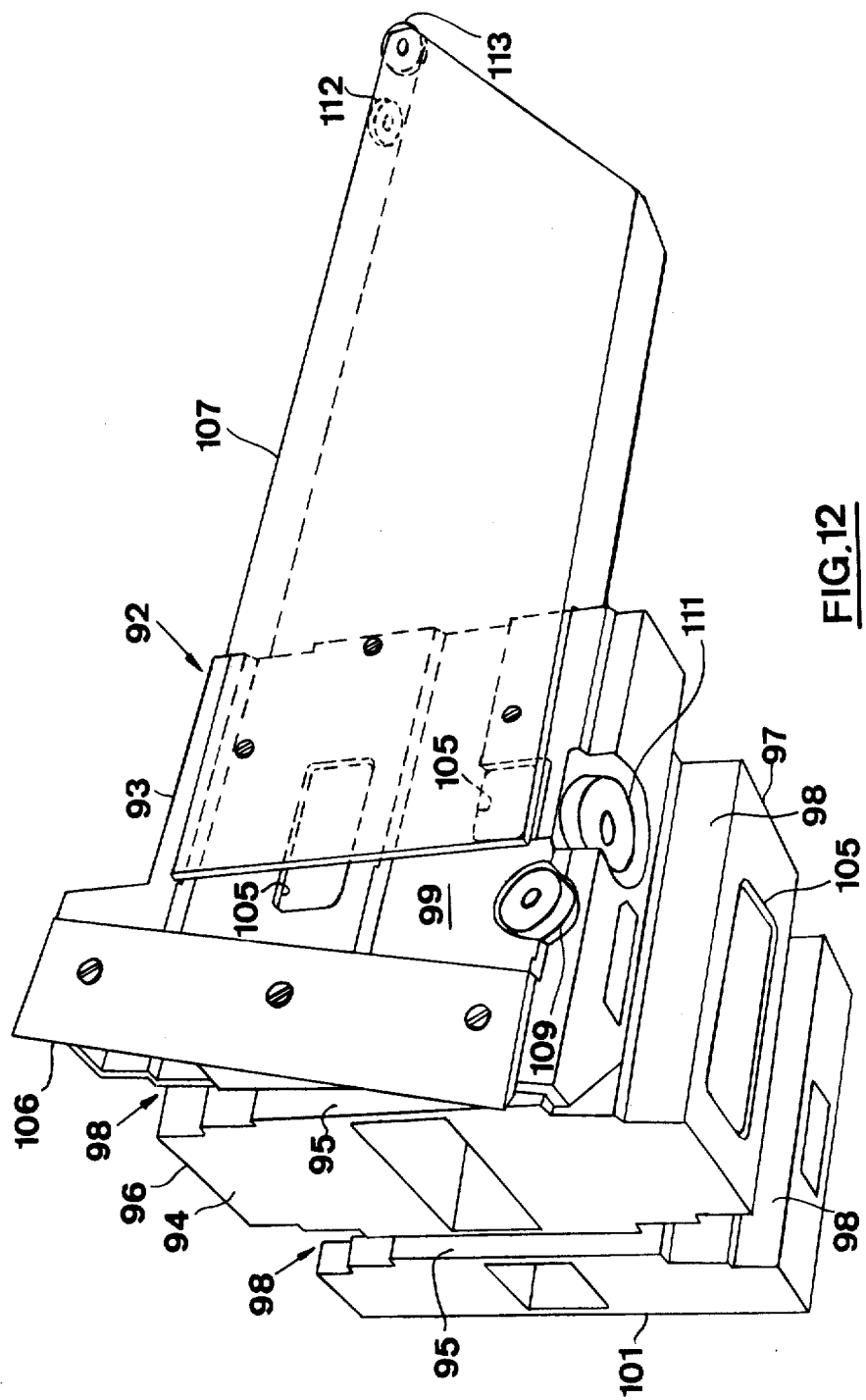
FIG. 12 is a perspective view of a plunger body of the baler.

Crop material fed into the bale case 2 by the feed mechanism 31 is compressed into bales by a reciprocable plunger 92 which moves back and forth across the feed opening 9. Referring to the FIGS. 12 and 13, the plunger 92 comprises a main plunger body 93 cast in aluminium in the particular shape shown in the drawings. Baler plungers normally are a very complicated weld assembly, whereby it is difficult to keep the tolerances within the desired limits and complicated weld fixtures are required. Furthermore, conventional plungers are relatively heavy. The aluminium plunger 92 is a much less complicated and is a lightweight structure which is relatively easy to manufacture within the desired tolerances and which requires a minimum of machining. Furthermore, the weight, and hence the inertia forces, are reduced, or the plunger speed may be increased for the same inertia forces. The plunger body 93 comprises a plunger or working face 94 with a pair of grooves 95 therein to accommodate the through passage of twine-carrying needles during the bale-wrapping or tying operation. Upper and lower walls 96 and 97 of the plunger body 93 are also formed with recesses 98 aligned with respective grooves 95 to accommodate the passage of the plunger 92 beyond bale groovers and hay dogs located within the bale case 2 in a manner known in the art, whereby the bale groovers and hay dogs are not shown in the drawings. The plunger 92 also comprises a pair of opposed side walls 99 and 101 so that basically, the plunger has an open box configuration with the "opening" facing in the forward direction when assembled in the bale case 2. The plunger 92 is formed with integral and aligned bosses 102 in the side walls 99 and 101 which support a pivot pin (not shown) which is connected to one end of a connecting rod (not shown), the other end of which is connected to a crank shaft 100 (FIG. 6) driven from the gearbox 16. Integral reinforcing webs 103 and 104 extend between the side walls 99 and 101, closely spaced from either side of the bosses 102. The resulting reinforced box like plunger structure is found to have sufficient structural strength with only a minimum of material employed. The amount of material is even further reduced by providing apertures 105 in the plunger top, bottom and side walls.

The plunger body 93 supports a knife 106 at the leading right-hand side of the face 94 in a manner adapted for cooperation with the stationary shearbar 45. At the same side, the plunger body 93 also supports a plate 107 extending rearwardly therefrom for closing the feed opening 9 when the plunger is in the extended position. The plate 107 and the knife 106 are made of steel rather than of aluminium and are bolted on to the plunger body 93.

The bale case 2 supports at its upper lefthand corner and its lower right-hand corner adjustable L-shaped plunger guide rails 108 (FIG. 10) along which run respectively pairs of rollers 109 and 111 (FIGS. 11 and 12) provided on the plunger side, top and bottom walls adjacent the plunger face 94. A further pair of rollers 112 and 113 is provided at 90° relative to each other at the upper and rear end of the plate 107 and run along an adjustable rail 114 located in the right-hand side upper corner of the bale case 2 (FIG. 10).

The baler also comprises other components such as general drive means, a knotter mechanism and a bale tensioning device but these are generally known in the art and form no part of the present invention, whereby they will not be described.

OPERATION

In operation the baler 1 is moved across a field containing cut crop to be baled and in an offset relationship to the pulling tractor in a manner so that the pick up means 72 is aligned with a crop windrow. In this position, the shaft 22 is generally in line with a main input shaft 115 (FIG. 6) of the gearbox 16. The pick-up means 72 is in the lowered position adapted to pick up crop material from the ground. The cushioned wheel suspension 47, 57 underneath the bale case 2 and the feed housing structure 29 provide proper flotation for the baler 1 while reducing the shaking and jerking resulting from movement over rough terrain. This, coupled with the monocoque concept of the baler body reduces to a minimum stresses and deformation which might normally arise due to such movement. Furthermore, the lightweight boxlike construction of the plunger 92 produces minimal inertia forces and vibrations when the baler operates at normal capacity and acceptable inertia forces and vibrations when operating at an increased capacity not normally possible with known balers.

The crop material to be baled is thus picked up from the ground by the pick-up means 72, delivered thereby to the feed platform 36, and is then fed in successive batches or charges into the bale case 2 by the feed mechanism 31 in timed sequence with the reciprocating baler plunger 92. The baler plunger 92 compresses the material into a bale and at the same time gradually advances the bale towards the outlet of the bale case 2 in a rearward direction. A conventional metering device 116 (FIG. 2) is employed to actuate the knotter mechanism when a bale of a predetermined length has been formed. Once the bale has been tied, another bale is initiated and as that grows, it discharges the tied bale from the bale case 2 to the ground.

From what precedes it will be clear that the present invention provides a baler with improved reliability and durability and which may have an increased capacity. It also affords reduced and simplified maintenance and adjustment and has an extremely wide pick-up means whilst the overall width remains within the 2.50 meters for ease of road transport and field operation. This also enables easy and fast handling of material which still further increases capacity. Also the path of the baler relative to the windrow is less critical.

A baler in accordance with the present invention no longer has the conventional transverse wheel axle which, as already mentioned, is usually a relatively complicated and large weld assembly. The present baler has a "cleaner" and less complicated design and fewer parts so that the baler is more lightweight and less expensive to manufacture, consistent with having sufficient strength. Strength is built in in the baler concept rather than in a separate framework, thus giving a better strength-to-weight ratio.

The new baler concept has helped to eliminate the large weld assemblies common to existing balers and which often entailed problems with deformation resulting from the welding process. The introduction of lockbolt fasteners to replace welding has helped further to reduce the amount of welding. Thus it has become much easier to stay within set tolerances without incurring extra cost. Also, the large welding fixtures are no longer required in the welding shop and the work environment is improved with the reduction in heat and fumes resulting from the reduction in the amount of welding required.

Assembly of a baler in accordance with the present invention can be accomplished much faster and yet the fastening of one component to another is very firm resulting in good vibration resistance. The shock-absorbing wheel mountings enable smaller wheels to be provided. This has helped to enable mounting of the wheel structures underneath the bale case and the feed housing. This in turn has allowed provision of pick-up means of a width substantially exceeding the width of known pick-up means and yet keeping the overall width within the 2.50 meters limit. The cushioned wheel suspensions also provide smoother baler movement even over rough ground and at high forward speeds, whereby little or no adverse influence on baler operation is experienced. Also the risk of components being shaken loose is reduced. Furthermore, even though the wheels are provided underneath the baler, a low profile baler is obtained.

When the drawbar and the bale case extension are disconnected from the main body, the overall length is also within the 2.50 meters limit. This means that the main baler body can be loaded on the loadbed of a truck in an upright position standing transversely of the loadbed either on its back end or on its side. Thus at least 50% more loading capacity per truck is obtained.

Together with the shock-absorbing wheel mountings referred to above, the twin wheel arrangement underneath the bale case has helped to obtain maximum pick-up width within the acceptable overall width limit without sacrificing anything of the desired flotation characteristics and without increasing the overall baler height.

The plunger is of a very simple and "clean" design and is relatively lightweight while still having sufficient structural strength. As already mentioned, the light weight reduces the plunger inertia forces substantially whereby, it has become possible further to increase the number of plunger strokes per minute which can be as high as 120 compared with 90 to 100 of conventional balers. Thus, the capacity of the baler is increased, on the one hand, while on the other hand bales with a consistent shape and length are formed. Furthermore, the new plunger makes it easier to stay within set tolerances with only a minimum of machining, thereby reducing the costs.

Having thus described the invention, what is claimed is:

1. An agricultural baler comprising:
   a bale case extending in a first direction;
   a crop feeding housing having a first end connected to said bale case and extending therefrom in a second direction transverse to said first direction, said housing terminating at a second end spaced from said first end;
   said bale case having a feed opening formed therein adjacent the connection of said first end of said crop feed housing and said bale case;
   a first support member connected to said bale case and said crop feed housing, said first member being coextensive with said crop feed housing;
   a second support member connected to said bale case and said crop feed housing, said second member being coextensive with said crop feed housing;
   said first and second support members having first ends spaced apart by opposed portions of said bale case and having second ends spaced apart by opposed portions of said crop feed housing;
   a first wheel support member connected to the second support member adjacent said second end of said crop feed housing and between the first and second ends of the crop feed housing;
   a first wheel mounted on said first wheel support member;
   a second wheel support member connected to said bale case adjacent said first end of said crop feed housing; and
   at least a second wheel mounted on said second wheel support.

2. The baler of claim 1 including:
   crop feed apparatus mounted in said crop feed housing; and
   a surface of said first support member has openings formed therein for manual access to said crop feed apparatus.

3. The baler of claim 1 including
   a third support member interconnecting said bale case and said second support member adjacent said feed opening.

4. The baler of claim 2 wherein said second support member is of sheet metal formed into a hollow beam and having a portion providing a feed platform adjacent said crop feed apparatus in feed housing.

5. The baler of claim 1 wherein said second wheel support member includes a pair of wheels mounted thereon.

6. The baler of claim 1 wherein each of said first and second wheel support member includes:
   an inclined mounting surface;
   a pivot member connected to said mounting surface;
   a pivot arm connected to said pivot member;
   a first stop connected to said pivot arm;
   a second stop connected to said wheel support; and
   at least one resilient shock absorbing member between said first and second stops.

* * * * *